US012589524B2

(12) United States Patent
Moon

(10) Patent No.: US 12,589,524 B2
(45) Date of Patent: Mar. 31, 2026

(54) PROCESSING METHOD OF RECYCLING PET MATERIAL FROM BAGS

(71) Applicant: MILAGROS INTERNATIONAL INC., Taipei City (TW)

(72) Inventor: Jerry Moon, Taipei City (TW)

(73) Assignee: MILAGROS INTERNATIONAL INC., Taipei City (TW)

( * ) Notice: Subject to any disclaimer, the term of this patent is extended or adjusted under 35 U.S.C. 154(b) by 237 days.

(21) Appl. No.: 18/605,297

(22) Filed: Mar. 14, 2024

(65) Prior Publication Data

US 2025/0289164 A1 Sep. 18, 2025

(51) Int. Cl.
| | |
|---|---|
| *B29B 9/06* | (2006.01) |
| *B29B 17/00* | (2006.01) |
| *B29B 17/04* | (2006.01) |
| *B29K 67/00* | (2006.01) |
| *B29K 105/26* | (2006.01) |
| *B29L 31/00* | (2006.01) |

(52) U.S. Cl.
CPC ............ *B29B 9/06* (2013.01); *B29B 17/0036* (2013.01); *B29B 17/0412* (2013.01); *B29K 2067/003* (2013.01); *B29K 2105/26* (2013.01); *B29L 2031/7128* (2013.01)

(58) Field of Classification Search
CPC ... B29B 9/06; B29B 17/0036; B29B 17/0412; B29K 2067/003; B29K 2105/26; B29L 2031/7128; Y02W 30/62
See application file for complete search history.

(56) References Cited

U.S. PATENT DOCUMENTS

| | | | | |
|---|---|---|---|---|
| 5,225,130 A | * | 7/1993 | Deiringer | ................. C08J 11/06 425/185 |
| 5,516,472 A | * | 5/1996 | Laver | .................. B29C 48/2556 428/903.3 |

(Continued)

FOREIGN PATENT DOCUMENTS

| | | | | | |
|---|---|---|---|---|---|
| JP | 2005023193 A | * | 1/2005 | ............. | B29B 17/04 |
| JP | 3717498 B2 | * | 11/2005 | ............. | B29B 17/04 |

(Continued)

OTHER PUBLICATIONS

English Translation for JP200523193 (Year: 2005).*

*Primary Examiner* — Seyed Masoud Malekzadeh
(74) *Attorney, Agent, or Firm* — Rabin & Berdo, P.C.

(57) ABSTRACT

A processing method of recycling PET material from bags includes the steps of breaking a bag into a plurality of PET broken pieces and PET fragments; blending the PET broken pieces and PET fragments to form a plurality of plastic granules; thermally plasticizing the plastic granules into a continuous plastic bar; cooling the continuous plastic bar to cure the same into a cured plastic bar, which is cut into a plurality of recycled plastic pellets; thermally plasticizing a mixture of the recycled plastic pellets and a compatibilizer to form a continuous modified plastic bar; and lastly, cooling the continuous modified plastic bar to cure the same into a cured and modified plastic bar, which is cut into a plurality of modified plastic pellets. With the above PET recycling method, it is able to save the step of sorting materials and produce modified plastic pellets with enhanced mechanical strength.

8 Claims, 9 Drawing Sheets

(56) References Cited

U.S. PATENT DOCUMENTS

| | | | | |
|---|---|---|---|---|
| 5,876,644 | A * | 3/1999 | Nichols | B29B 17/0026 |
| | | | | 264/141 |
| 8,476,367 | B1 * | 7/2013 | Howell | B29B 9/065 |
| | | | | 525/97 |
| 9,636,845 | B2 * | 5/2017 | Clark | B29C 48/435 |
| 11,285,650 | B2 * | 3/2022 | Wycech | C08J 9/0061 |
| 11,466,135 | B2 * | 10/2022 | Yang | B29C 55/005 |
| 2014/0265004 | A1 * | 9/2014 | Wycech | B29B 9/06 |
| | | | | 264/141 |
| 2015/0069652 | A1 * | 3/2015 | Clark | B29B 17/0412 |
| | | | | 264/143 |
| 2019/0084184 | A1 * | 3/2019 | Wycech | B29B 9/16 |
| 2022/0235187 | A1 * | 7/2022 | Yang | C08J 5/18 |
| 2023/0015402 | A1 * | 1/2023 | Wycech | B29C 48/0012 |
| 2024/0351248 | A1 * | 10/2024 | Cotter | B29B 7/007 |
| 2025/0135687 | A1 * | 5/2025 | Skelley | B29C 48/05 |

FOREIGN PATENT DOCUMENTS

| | | | | |
|---|---|---|---|---|
| JP | 2005343104 | A | * | 12/2005 |
| JP | 2011006521 | A | * | 1/2011 |

* cited by examiner

10

PROCESSING METHOD OF RECYCLING PET MATERIAL FROM BAGS

FIELD OF THE INVENTION

The present invention relates to a processing method of recycling polyethylene terephthalate (PET) material from bags, such as handbags or backpacks; and more particularly, to a PET recycling method that directly recycles the PET material contained in bags to save the step of sorting materials and produce plastic pellets with higher mechanical strength.

BACKGROUND OF THE INVENTION

In Taiwan, polyethylene terephthalate (PET) is one of the most frequently produced polymeric materials. The constantly increased use of PET has resulted in a large amount of PET waste, which seriously contaminates the terrestrial and marine environments of the earth. For the purpose of reducing the probability of terrestrial and marine environment contamination by PET waste, many countries in the world have established strict norms of reuse of PET to increase the percentage of recycling PET from various products. Therefore, PET reuse has become an important issue in environmental protection, which not only reduces the $CO_2e$ emission to meet the environmental protection appeals for 3R, namely, reduction, recycle, and reuse, but also achieves the effect of energy saving.

PET is a type of transparent, high-strength, and wear-resistant plastic material being widely used in making different products, such as PET bottles, packing materials, and artificial fibers. Currently, there is a PET backpack made of PET material available in the market. However, the PET backpack also includes zippers and fasteners made of a polyoxymethylene (POM) material. Therefore, these non-PET material zippers and fasteners must be removed form the PET bag before the bag is recycled. This inevitably increases the steps of the PET bag recycling process.

SUMMARY OF THE INVENTION

A primary object of the present invention is to provide a processing method of recycling PET material from bags, so that bags can be recycled directly to save the step of sorting materials and produce plastic pellets with high mechanical strength.

Another object of the present invention is to provide an improved processing method of recycling PET material from bags, in which an adequate amount of compatibilizer is added to a specific weight of recycled PET material, so as to increase the structural strength of the recycled plastic pellets and prevent the plastic pellets from pyrolysis.

A further object of the present invention is to provide improved structural compositions for a bag body. The improved bag body consists of a layer of woven fabric, a layer of knitted fabric, and a layer of polyurethane (PU) coating. Since the PU coating is featured by a relatively high temperature for pyrolysis, it can resist the high melting temperature without being deteriorated when the bag body is recycled. Therefore, the heated PU coating would not affect the chemical structure of the woven fabric and the knitted fabric, and the woven fabric and the knitted fabric would not cause degradation of the polymer chains of the PET material.

To achieve the above and other objects, the processing method of recycling PET material from bags provided according to the present invention is used to recycle bags. The bags respectively include a body, a zipper, and a fastener. The body of the bag includes a layer of woven fabric made of a PET material, a layer of knitted fabric also made of a PET material, and a layer of PU coating located between the woven fabric and the knitted fabric. Both the zipper and the fastener are also made of a PET material.

The processing method of recycling PET material from bags according to the present invention includes a breaking step, a blending step, a shaping step, a first pelletizing step, a modifying and shaping step, and a second pelletizing step.

In the breaking step, the bag is cut by a breaker machine, such that the body of the bag is cut into a plurality of PET broken pieces, and the zipper and the fastener are cut into a plurality of PET fragments. In the blending step, the PET broken pieces and the PET fragments are put into a blender machine for blending and rubbing with one another, then the temperatures of the PET broken pieces and the PET fragments are risen to a frictional temperature for melting their surfaces, and the PET broken pieces and the PET fragments become adhered to one another to form a plurality of plastic granules with different sizes.

In the shaping step, the plastic granules are put into a first shaper machine to be thermally plasticized into a continuous plastic bar. In the first pelletizing step, the continuous plastic bar is cooled in a first pelletizer machine to form a cured plastic bar, then the cured plastic bar is cut by the first pelletizer machine into a plurality of recycled plastic pellets having the same size.

In the modifying and shaping step, the recycled plastic pellets and a compatibilizer are put into a second shaper machine to be thermally plasticized into a continuous modified plastic bar. In the second pelletizing step, the continuous modified plastic bar is cooled in a second pelletizer machine to form a cured modified plastic bar, then the cured modified plastic bar is cut by the second pelletizer machine into a plurality of modified plastic pellets having the same size.

In the course of the shaping step according to a preferred embodiment of the present invention, the first shaper machine heats the plastic granules to a first melting temperature that is higher than the frictional temperature, such that the plastic granules melt to form first plastic slurry; and the first plastic slurry is thermally plasticized into the continuous plastic bar.

In the course of the modifying and shaping step, the second shaper machine heats the recycled plastic pellets and the compatibilizer to a second melting temperature that is higher than the frictional temperature, such that the recycled plastic pellets and the compatibilizer melt to form second plastic slurry; and the second plastic slurry is thermally plasticized by the second shaper machine to form the continuous modified plastic bar.

The second shaper machine includes a weight module. The weight module enables the recycled plastic pellets to be fed in batches to mix with the compatibilizer, so that the recycled plastic pellets of a specific weight are mixed with a preset amount of the compatibilizer.

According to the PET recycling method of the present invention, the continuous modified plastic bar contains 93~97 wt % of the recycled plastic pellets, and 3~7 wt % of the compatibilizer; the woven fabric and the knitted fabric have the same melting point; and the PU coating has a heat-resistant temperature higher than the melting point of the woven fabric.

The blender machine includes a heater for supplying external heat energy to aid in the heating of the PET broken pieces and the PET fragments, such that the plurality of plastic granules can maintain at the frictional temperature with the help of the external heat energy supplied by the heater. And, the bag further includes a part connected to the body of the bag. The part is made of an expandable polyethylene (EPE) material; and the bag contains 6~10 wt % of the EPE material and accordingly, 90~94 wt % of the PET material.

The present invention is characterized in that the bag to be recycled includes a body made of PET material, as well as a zipper and a fastener also made of PET material. Therefore, it is not necessary to separate the body, the zipper and the fastener of the bag from each other in the course of the processing method of recycling PET material from bags according to the present invention. Instead, the bag can be directly broken to produce the modified plastic pellets to save the step of sorting materials and produce plastic pellets with enhanced mechanical strength.

In the PET recycling method of the present invention, a plurality of recycled plastic pellets is produced before the modified plastic pellets are produced. Further, with the weight module of the second shaper machine, the amount of compatibilizer for adding into the second shaper machine can be determined according to the weight of the recycled plastic pellets. In this way, the produced modified plastic pellets can have increased structural strength and it is able to prevent the modified plastic pellets from pyrolysis.

Further, as having been mentioned above, the body of the bag consists of woven fabric, knitted fabric and PU coating. The woven fabric and the knitted fabric are made of the same material and accordingly, have the same melting point. On the other hand, the PU coating has a heat-resistant temperature higher than the melting point of the woven fabric and the knitted fabric. Therefore, when the bag is subjected to the PET recycling method of the present invention, the PU coating can resist the melting temperature during recycling without becoming deteriorated and would not affect the chemical structure of the woven fabric and the knitted fabric, such that the woven fabric and the knitted fabric can form high-density modified plastic pellets in the process of recycling.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
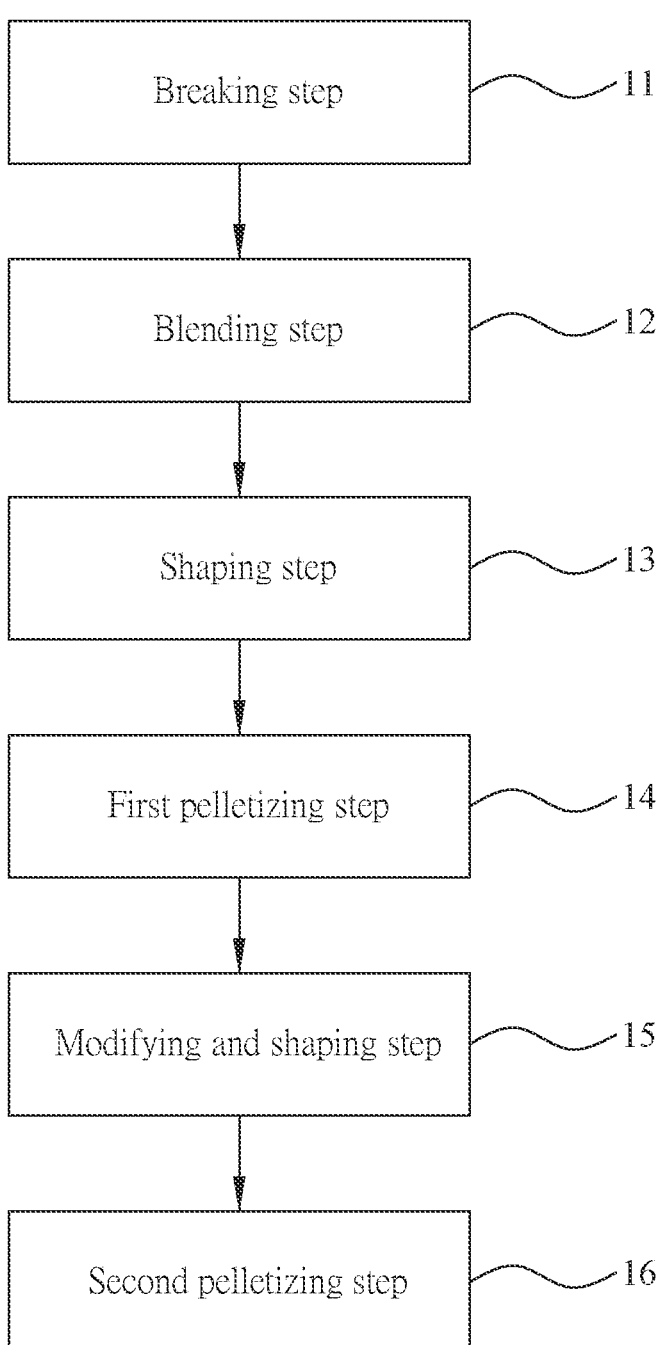
FIG. 1 is a flowchart showing the steps included in a processing method of recycling PE material from bags according to a preferred embodiment of the present invention.
Figure 2:
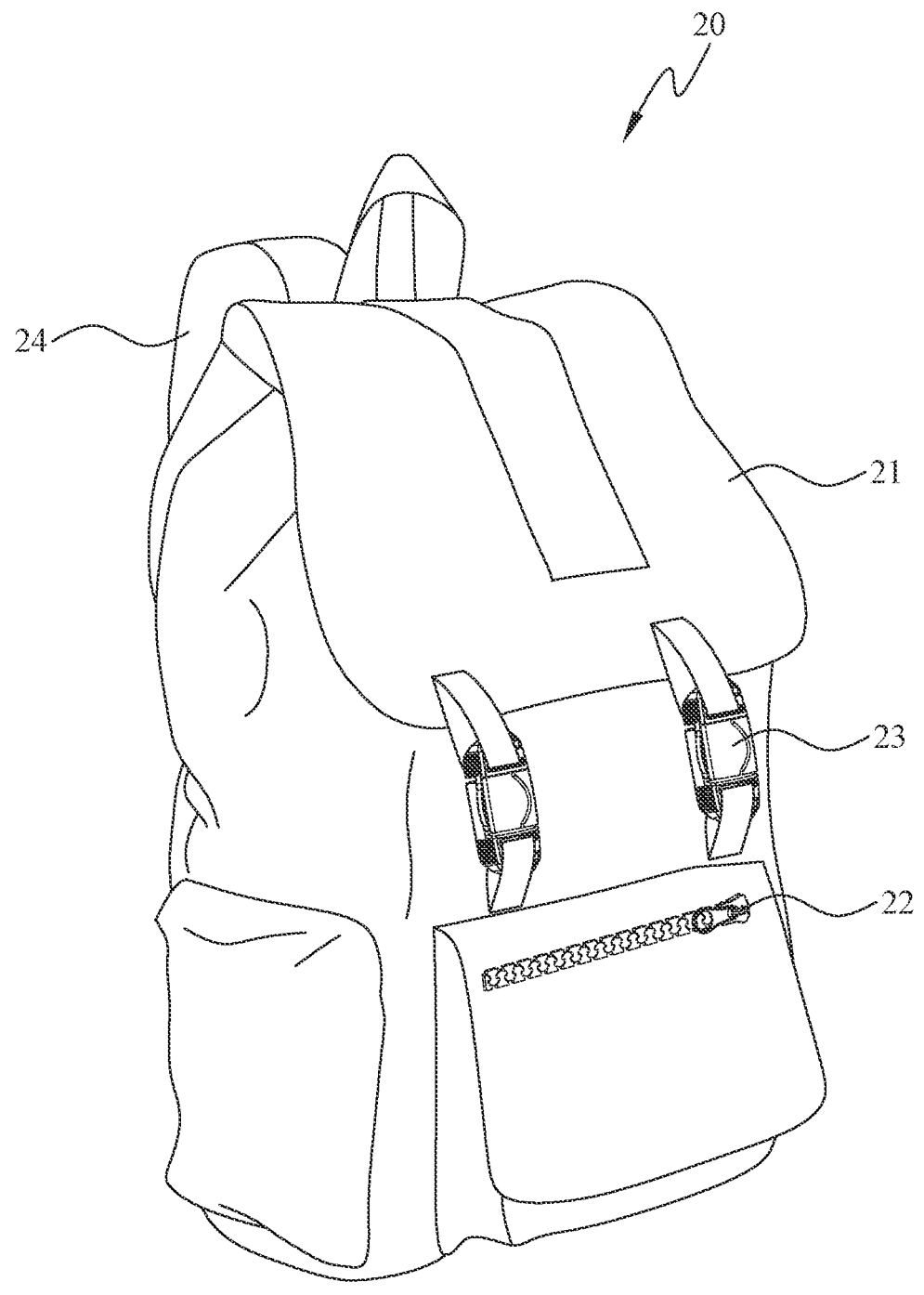
FIG. 2 shows an example of bag, from which PET material will be recycled according to the PET recycling method of the present invention.
Figure 3:
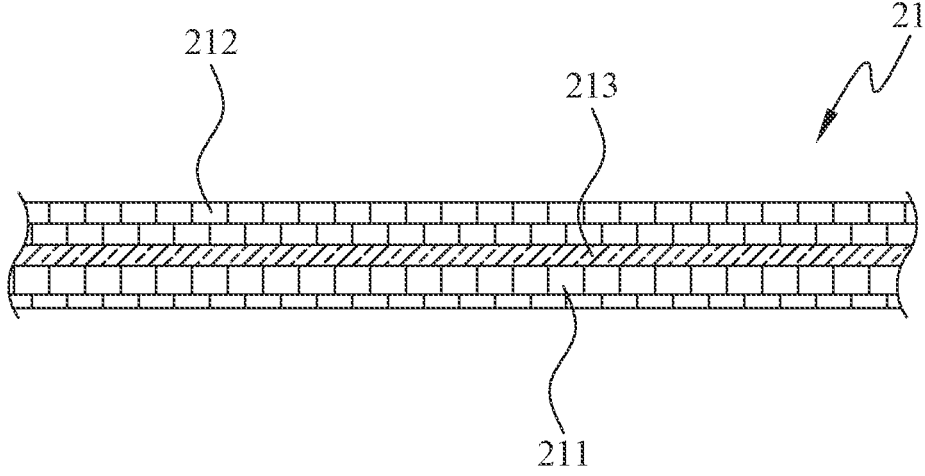
FIG. 3 is a fragmentary sectional view of a body of the bag shown in FIG. 2.

Please refer to FIGS. 1 and 2. The processing method of recycling PET material from bags according to the present invention is generally denoted by reference numeral 10, and is also briefly referred to as the PET recycling method herein. The bags usable in the present invention are various in types, an example of which may be a backpack 20 as shown in FIGS. 2 and 3. The backpack 20 generally includes a body 21 for holding things therein, a zipper 22, a fastener 23, and a part 24 attached to the body 21. The body 21 is made of a material consisting of a layer of woven fabric 211, a layer of knitted fabric 212, and a layer of polyurethane (PU) coating 213. Both the woven fabric 211 and the knitted fabric 212 are made of a polyethylene terephthalate (PET) material. As such, the woven fabric 211 and the knitted fabric 212 have the same melting point of 260° C. The PU coating 213 is located between the woven fabric 211 and the knitted fabric 212, so that the woven fabric 211 is bonded to the knitted fabric 212 via the PU coating 213. The PU coating 213 is featured by a relatively high temperature for pyrolysis, so that its heat-resistance temperature is set to 270° C., which is higher than the melting point of the woven fabric 211. The PU coating 213 has a viscosity ranged from 800 to 1000 millipascal-second (mPa·S) and is a high-viscosity colloid; and the PU coating 213 has a molecular mass ranged from 100,000 to 1,000,000 g/mole. The zipper 22 and the fastener 23 are made of a PET material. The part 24 is a shoulder strap connected to the body 21, and is made of an expandable polyethylene (EPE) material. In the preferred embodiment of the present invention, the bag 20 contains 6~10 wt % of the EPE material, 1~2 wt % of the PU coating 213, and 90~94 wt % of the PET material. In a most preferred embodiment, the bag 20 contains 8 wt % of the EPE material and 1.5 wt % of the PU coating 213.

Figure 4:
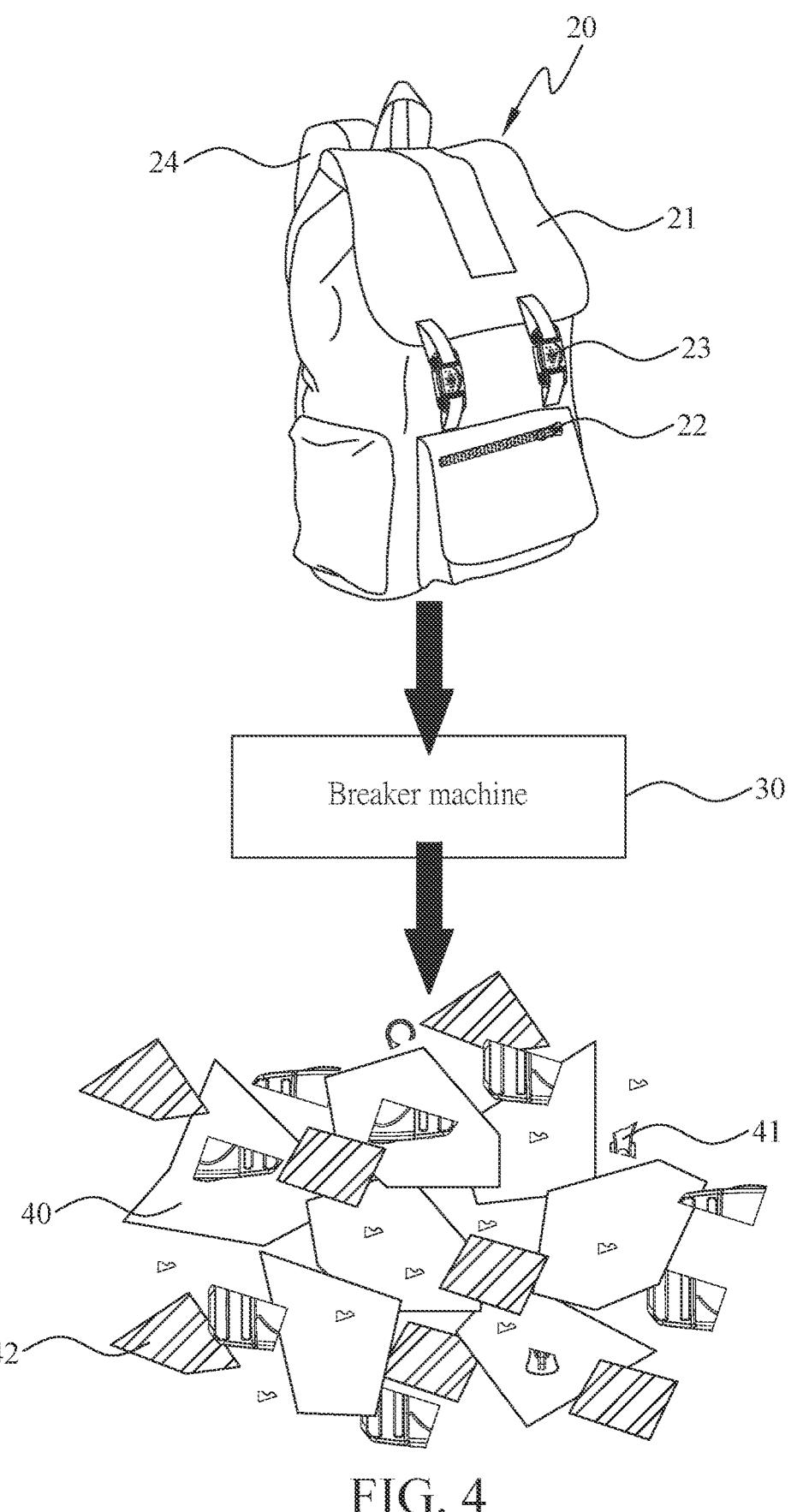
FIG. 4 pictorially shows the breaking step shown in FIG. 1.

Please refer to FIG. 1 and FIGS. 4 to 9, which show the use of the PET recycling method 10 of the present invention to recycle PET material from the bag 20. First, as shown in FIGS. 1 and 4, in a breaking step 11, the bag 20 is cut by a breaker machine 30, such that the body 21 of the bag 20 is cut into a plurality of PET broken pieces 40; the zipper 22 and the fastener 23 are cut into a plurality of PET fragments 41, and the part 24 is cut into a plurality of EPE broken pieces 42.

Figure 5:
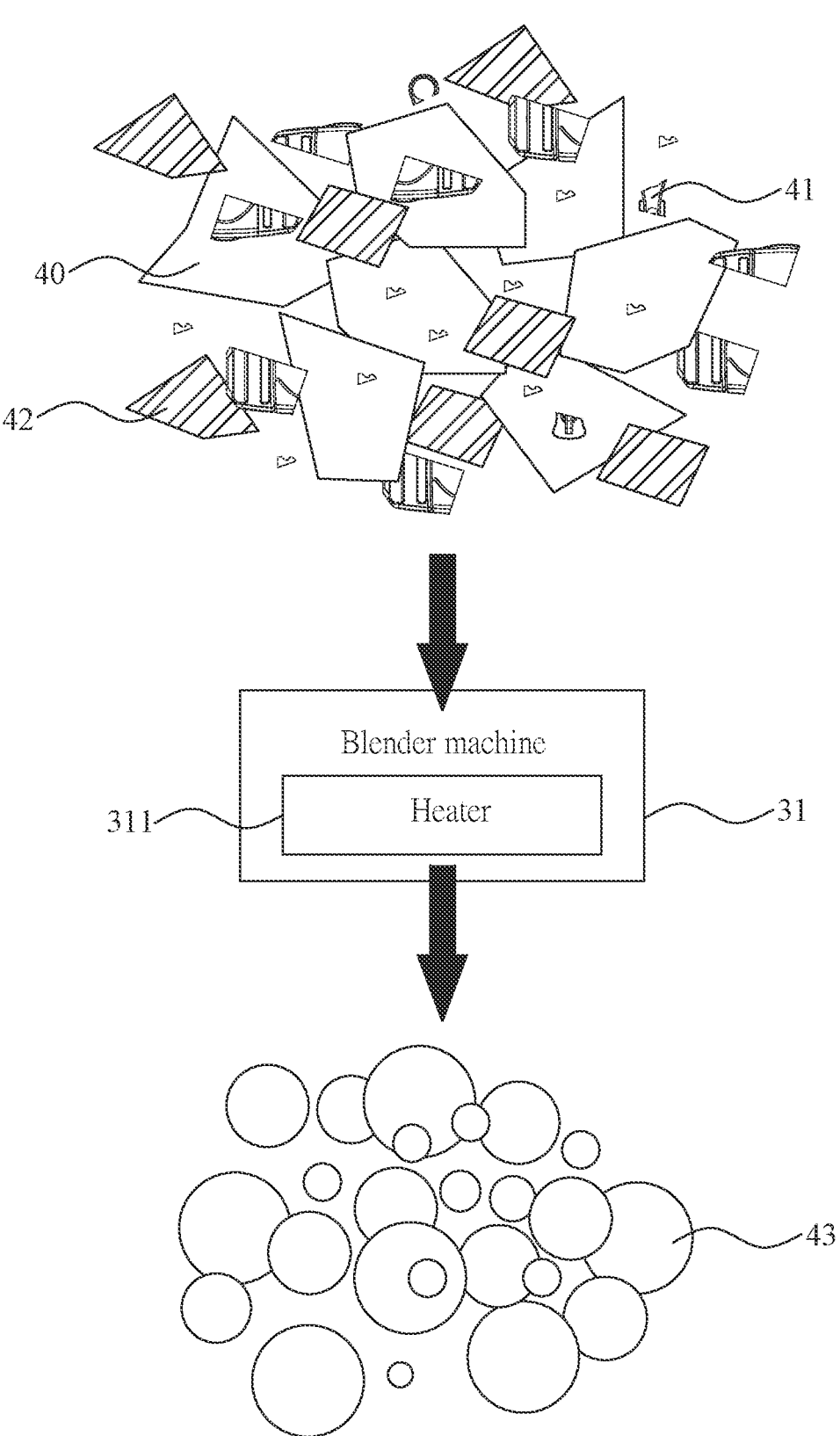
FIG. 5 pictorially shows the blending step shown in FIG. 1.

Please refer to FIGS. 1 and 5. In a blending step 12 after the breaking step 11, the plurality of PET broken pieces 40, the plurality of PET fragments 41, and the plurality of EPE broken pieces 42 are put into a blender machine 31. In the blender machine 31, the PET broken pieces 40, the PET fragments 41, and the EPE broken pieces 42 rub with one another while being blended. At this point, friction occurs among the rubbing PET broken pieces 40, PET fragments 41 and EPE broken pieces 42 to produce heat that results in temperature rise of the PET broken pieces 40, the PET fragments 41 and the EPE broken pieces 42 to a frictional temperature set to 110° C. When the PET broken pieces 40, the PET fragments 41 and the EPE broken pieces 42 are heated to the frictional temperature, their surfaces would melt. Under continuous blending by the blender machine 31, the PET broken pieces 40, the PET fragments 41 and the EPE broken pieces 42 adhere to one another to form plastic granules 43 of different sizes. In the preferred embodiment, the blender machine 31 includes a heater 311 for supplying external heat energy to aid in the heating of the PET broken pieces 40, the PET fragments 41 and the EPE broken pieces 42 while the blender machine 31 keeps blending them. Therefore, the plastic granules 43 so formed can maintain at the frictional temperature with the help of the external heat energy supplied by the heater 311.

Figure 6:
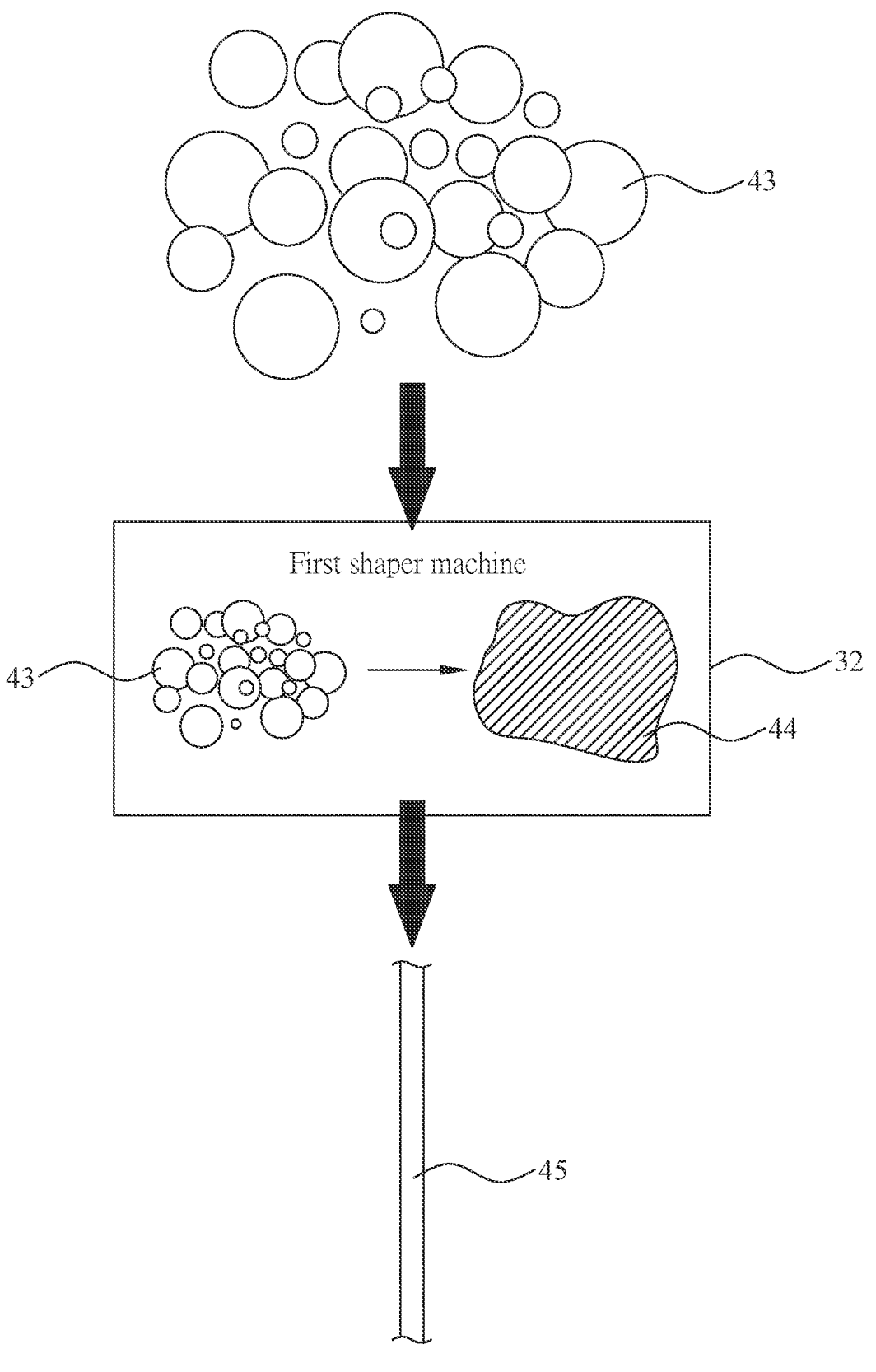
FIG. 6 pictorially shows the shaping step shown in FIG. 1.

Please refer to FIGS. 1 and 6. In a shaping step 13 after the blending step 12, the plurality of plastic granules 43 are put into a first shaper machine 32. The first shaper machine 32 heats the plastic granules 43 to a first melting temperature, which is higher than the frictional temperature, so that the plastic granules 43 is molten to form first plastic slurry 44. Then, the first plastic slurry 44 is thermally plasticized in the first shaper machine 32 to form a continuous deformable plastic bar 45. In the preferred embodiment, the first melting temperature is set to 260° C. Since the PU coating 213 has a heat-resistant temperature higher than the melting point of the woven fabric 211 and the knitted fabric 212, the PU coating 213 can resist the first melting temperature without becoming deteriorated in nature when the plastic granules 43 are heated in the first shaper machine 32 and molten into the first plastic slurry 44. Therefore, the heated PU coating 213 would not affect the chemical structure of the woven fabric 211 and the knitted fabric 212.

Figure 7:
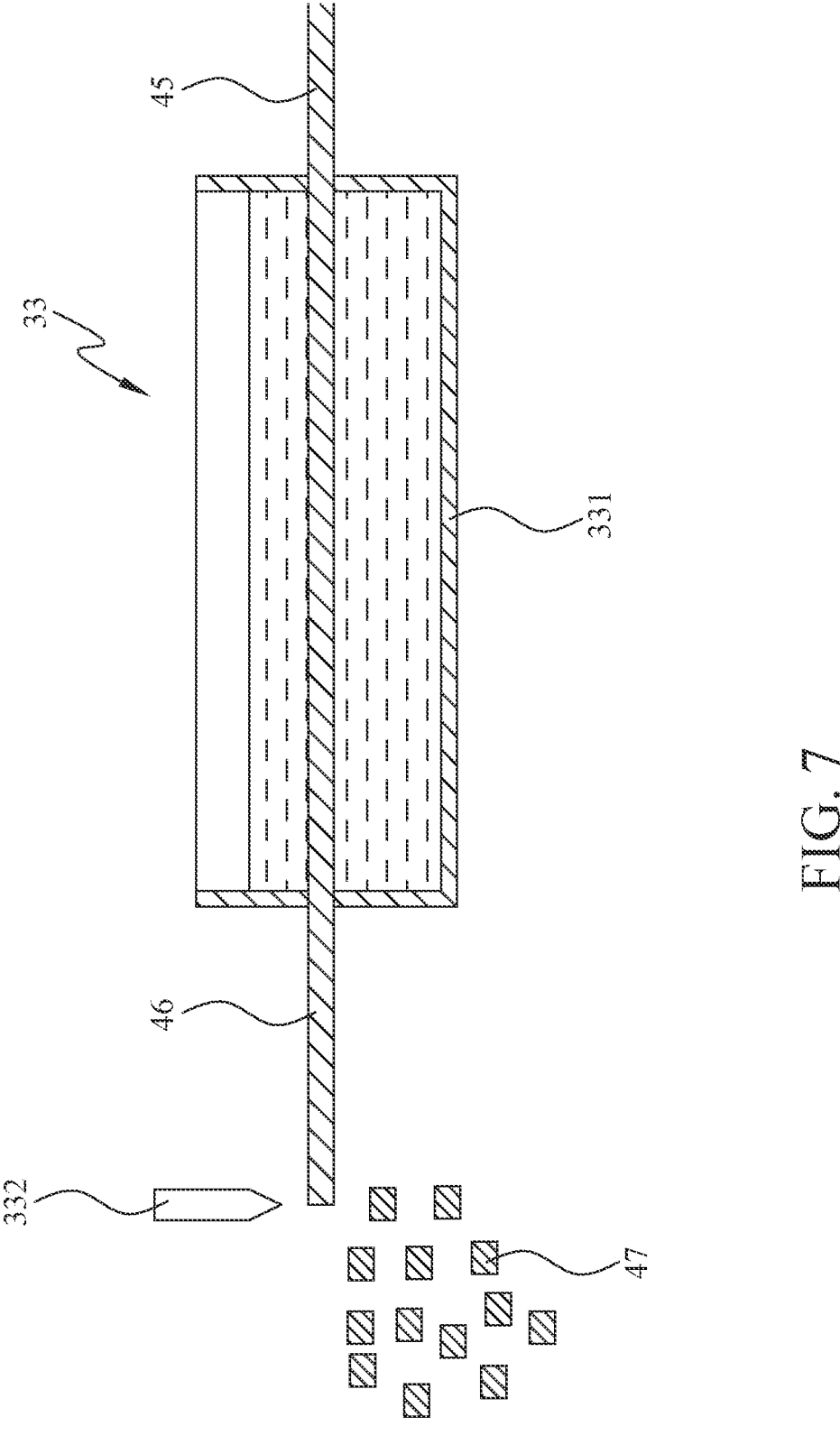
FIG. 7 pictorially shows the first pelletizing step shown in FIG. 1.

Please refer to FIGS. 1 and 7. In a first pelletizing step 14 after the shaping step 13, the continuous plastic bar 45 is moved to a first pelletizer machine 33 and guided into a first water tank 331. The continuous plastic bar 45 immersed in a water solution is cooled and cured to form a cured non-deformable plastic bar 46. Thereafter, a first cutting knife 332 of the first pelletizer machine 33 cuts the cured plastic bar 46 into a plurality of recycled plastic pellets 47 having the same size.

Figure 8:
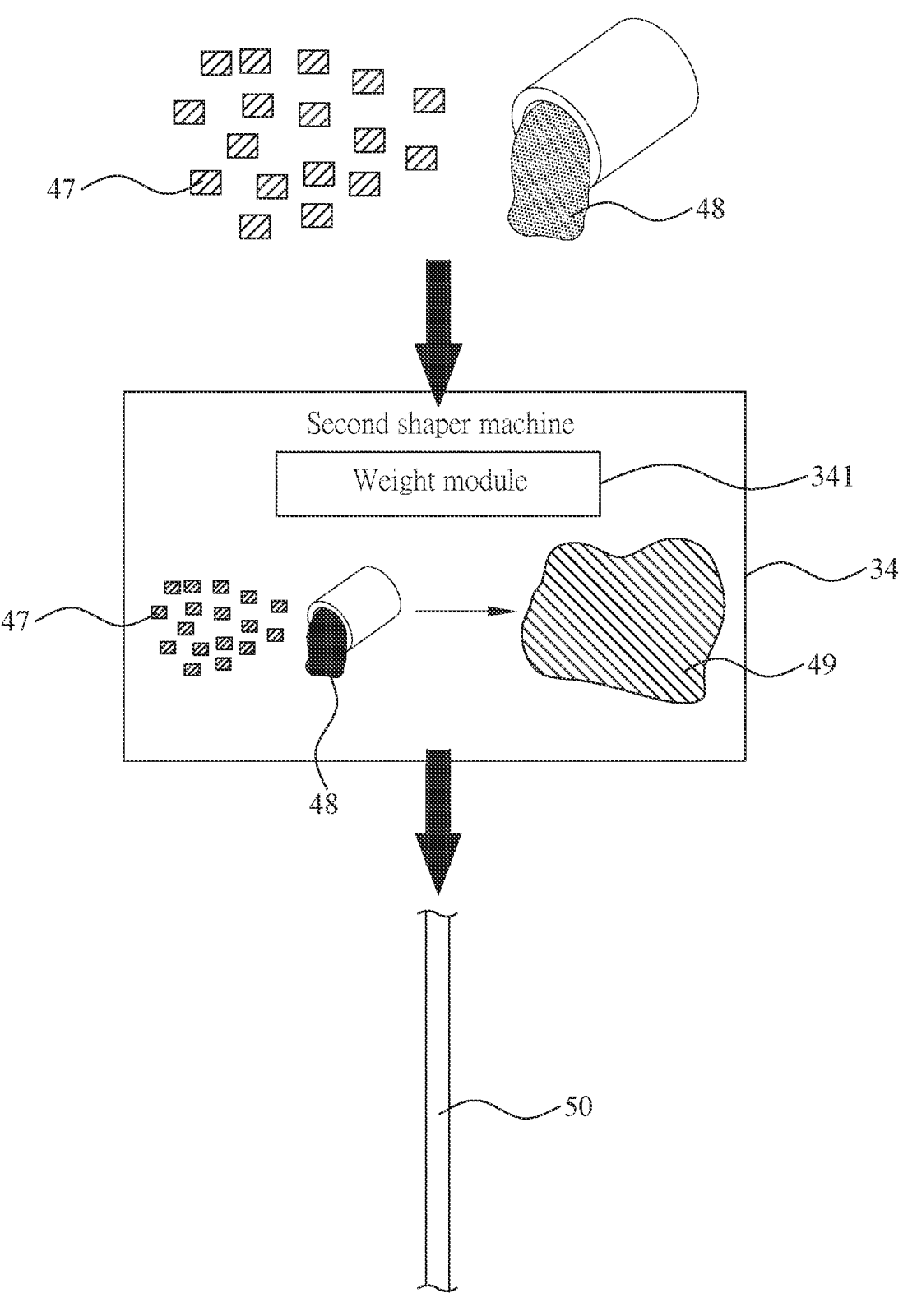
FIG. 8 pictorially shows the modifying and shaping step shown in FIG. 1.

Please refer to FIGS. 1 and 8. In a modifying and shaping step 15 after the first pelletizing step 14, the plurality of recycled plastic pellets 47 and a compatibilizer 48 are put into a second shaper machine 34, in which the recycled plastic pellets 47 and the compatibilizer 48 are heated to a second melting temperature that is higher than the frictional temperature, so that the recycled plastic pellets 47 and the compatibilizer 48 are molten. The compatibilizer 48 can increase the compatibility between the PET material and the EPE material in the recycled plastic pellets 47 when they are in a processing environment with a high melting temperature, so that the recycled plastic pellets 47 and the compatibilizer 48 can mix to form second plastic slurry 49. Thereafter, the second plastic slurry 49 is thermally plasticized in the second shaper machine 34 to form a continuous, deformable and modified plastic bar 50. In the preferred embodiment, the second melt temperature is set to 260° C. and the compatibilizer 48 used is Ethylene-methyl Acrylate-glycidyl Methacrylate Terpolymer (LOTADER® AX8900 produced by Arkema). Since the PU coating 213 has a heat-resistant temperature higher than the melting point of the woven fabric 211 and the knitted fabric 212, the PU coating 213 can resist the second melting temperature without becoming deteriorated in nature when the recycled plastic pellets 47 are heated in the second shaper machine 34 and molten into the second plastic slurry 49. Therefore, the heated PU coating 213 would not affect the chemical structure of the woven fabric 211 and the knitted fabric 212. Further, the second shaper machine 30 34 includes a weight module 341, with which the recycled plastic pellets 47 are fed in batches to mix with the compatibilizer 48, so that the recycled plastic pellets 47 of a specific weight are mixed with a preset amount of the compatibilizer 48. With this arrangement, the continuous modified plastic bar 50 contains 93~97 wt % of the recycled plastic pellets 47 and 3~7 wt % of the compatibilizer 48.

Figure 9:
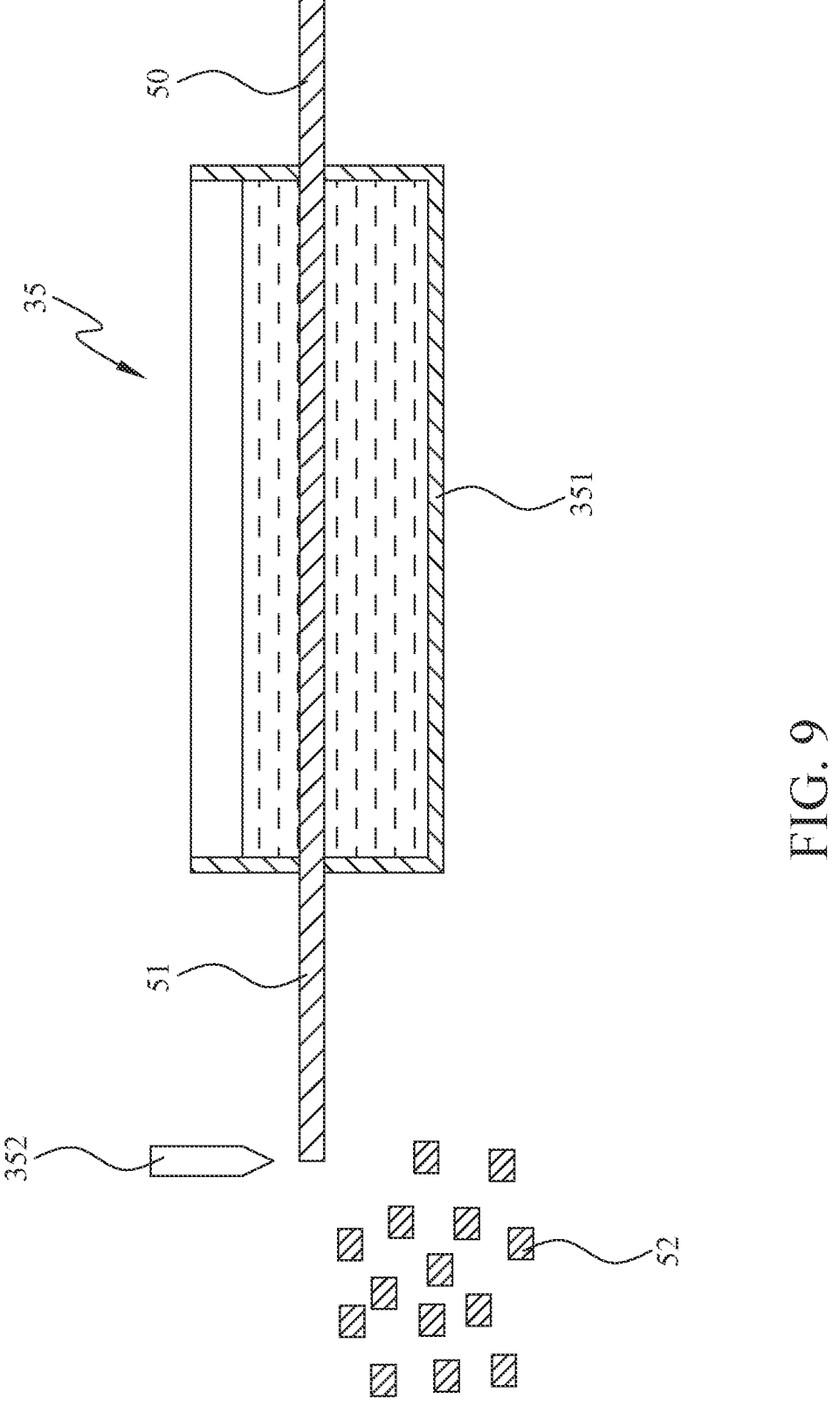
FIG. 9 pictorially shows the second pelletizing step shown in FIG. 1.

Please refer to FIGS. 1 and 9. In a second pelletizing step 16 after the modifying and shaping step 15, the continuous modified plastic bar 50 is moved to a second pelletizer machine 35 and guided into a second water tank 351. The continuous modified plastic bar 50 immersed in the water solution is cooled and cured to form a cured non-deformable and modified plastic bar 51. Thereafter, a second cutting knife 352 of the second pelletizer machine 35 cuts the cured and modified plastic bar 51 into a plurality of modified plastic pellets 52 having the same size.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A processing method of recycling PET material from bags, the bags respectively having a body for holding things, a zipper and a fastener; the body made of a material consisting of a layer of polyethylene terephthalate (PET) woven fabric, a layer of PET knitted fabric, and a layer of polyurethane (PU) coating located between the PET woven fabric and the PET knitted fabric, and the zipper and the fastener both made of a PET material, the processing method comprising the following steps:

a breaking step, in which a breaker machine is used to cut the bags so as the body is cut into a plurality of PET broken pieces, and the zipper and the fastener are cut into a plurality of PET fragments;

a blending step, in which the PET broken pieces and the PET fragments are put into a blender machine for blending and rubbing with one another, then temperatures of the PET broken pieces and the PET fragments are risen to a frictional temperature for melting their surfaces, and the PET broken pieces and the PET fragments become adhered to one another to form a plurality of plastic granules with different sizes;

a shaping step, in which the plastic granules are put into a first shaper machine to be thermally plasticized into a continuous plastic bar;

a first pelletizing step, in which the continuous plastic bar is cooled in a first pelletizer machine to form a cured plastic bar, then the cured plastic bar is cut by the first pelletizer machine into a plurality of recycled plastic pellets having a same size;

a modifying and shaping step, in which the recycled plastic pellets and a compatibilizer are put into a second shaper machine to be thermally plasticized into a continuous modified plastic bar; and a second pelletizing step, in which the continuous modified plastic bar is cooled in a second pelletizer machine to form a cured modified plastic bar, then the cured modified plastic bar is cut by the second pelletizer machine into a plurality of modified plastic pellets having a same size.

2. The processing method of recycling PET material from bags as claimed in claim 1, wherein, in the shaping step, the first shaper machine heats the plastic granules to a first melting temperature that is higher than the frictional temperature, such that the plastic granules melt to form first plastic slurry; and the first plastic slurry being thermally plasticized into the continuous plastic bar.

3. The processing method of recycling PET material from bags as claimed in claim 1, wherein, in the modifying and shaping step, the second shaper machine heats the recycled plastic pellets and the compatibilizer to a second melting temperature that is higher than the frictional temperature, such that the recycled plastic pellets and the compatibilizer melt to form second plastic slurry; and the second plastic slurry being thermally plasticized by the second shaper machine to form the continuous modified plastic bar.

4. The processing method of recycling PET material from bags as claimed in claim 1, wherein the second shaper machine includes a weight module; the weight module enabling the recycled plastic pellets to be fed in batches to mix with the compatibilizer, so that the recycled plastic pellets of a specific weight are mixed with a preset amount of the compatibilizer.

5. The processing method of recycling PET material from bags as claimed in claim 1, wherein the continuous modified plastic bar contains 93~97 wt % of the recycled plastic pellets, and 3~7 wt % of the compatibilizer.

6. The processing method of recycling PET material from bags as claimed in claim 1, wherein the woven fabric and the knitted fabric have a same melting point, and the PU coating has a heat-resistant temperature higher than the melting point of the woven fabric.

7. The processing method of recycling PET material from bags as claimed in claim 1, wherein the blender machine includes a heater for supplying external heat energy to aid in a heating of the PET broken pieces and the PET fragments, such that the plurality of plastic granules can maintain at the frictional temperature with help of the external heat energy supplied by the heater.

8. The processing method of recycling PET material from bags as claimed in claim 1, wherein each of the bags further includes a part connected to the body of each said bag; the part being made of an expandable polyethylene (EPE) material; and said each bag containing 6~10 wt % of the EPE material and accordingly, 90~94 wt % of the PET material.

* * * * *